US010635982B2

(12) United States Patent
Bnayahu et al.

(10) Patent No.: US 10,635,982 B2
(45) Date of Patent: Apr. 28, 2020

(54) OPTIMIZING SPATIOTEMPORAL COMPUTATIONAL PROBLEMS

(71) Applicant: International Business Machines Corporation, Armonk, NY (US)

(72) Inventors: Jonathan Bnayahu, Haifa (IL); Michael Katz, Nahariya (IL); Dany Moshkovich, Yokneam (IL)

(73) Assignee: International Business Machines Corporation, Armonk, NY (US)

(*) Notice: Subject to any disclaimer, the term of this patent is extended or adjusted under 35 U.S.C. 154(b) by 1094 days.

(21) Appl. No.: 14/849,718

(22) Filed: Sep. 10, 2015

(65) Prior Publication Data
US 2017/0075859 A1   Mar. 16, 2017

(51) Int. Cl.
*G06N 5/04* (2006.01)
*G06N 5/00* (2006.01)

(52) U.S. Cl.
CPC .......... *G06N 5/045* (2013.01); *G06N 5/003* (2013.01)

(58) Field of Classification Search
CPC ........ G06N 5/045; G06N 5/003; G06N 7/005; G06F 12/0246; G06F 8/433; G06F 8/75; G06F 2212/1032; G06F 8/10; G06F 8/73; G06F 8/72; G06F 2212/7203; G06F 8/20; G06F 11/1068; G06F 11/3624; G06F 11/3628; G06F 11/3676; G06F 1/1632; G06F 21/12; G06F 8/40; G06F 17/30979; G06F 1/1626; G06F 1/166; G06F 2200/1632; G06F 3/0481; G06F 11/1044; G06F 11/3604; G06F 11/3612; G06F 17/30569; G06F 21/121; G06F 21/125; G06F 21/563; G06F 21/577; G06F 8/34; G06F 8/443; G06F 8/74; G06F 8/77; G06F 9/45516; G06F 17/30554; G06F 17/30867; G06F 17/3087; G06F 11/1072; G06F 11/3414; G06F 11/3438; G06F 11/3476;
(Continued)

(56) References Cited

U.S. PATENT DOCUMENTS

2007/0011123 A1* 1/2007 Ruml ..................... G06N 5/003
706/45
2008/0243570 A1   10/2008 Moorkanat et al.
(Continued)

OTHER PUBLICATIONS

Akplogan et al., "A Weighted CSP Approach for Solving Spatio-Temporal Farm Planning Problems," Proceedings of the Soft'2011 Workshop, 2011, p. 1-15, Perugia, Italy.
(Continued)

*Primary Examiner* — Eric Nilsson
(74) *Attorney, Agent, or Firm* — Michael O'Keefe

(57) ABSTRACT

According to one embodiment, a method for solving a plurality of spatiotemporal planning problems. The method may include creating a domain model. The method may also include assigning a solution bound associated with the created domain model to infinity. The method may further include calculating a solution to the created domain model based on the assigned solution bound using at least one of a best-first search algorithm. The method may also include updating the assigned solution bound based on the calculated solution. The method may further include presenting the calculated solution to a user based on the updated solution bound not equaling infinity.

20 Claims, 9 Drawing Sheets

(58) Field of Classification Search
CPC ......... G06F 17/30117; G06F 17/30156; G06F 2221/031; G06F 2221/033; G06F 3/0221; G06F 3/04842; G06F 8/30; G06F 8/71; G06F 17/10; G06F 17/2241; G06F 17/30424; G06F 17/30604; G06F 17/5009; G06F 1/1616; G06F 1/1641; G06F 1/1666; G06F 1/1681; G06F 2212/1044; G06F 2212/7201; G06F 2212/7207; G06F 3/0231; G06F 9/4843; G06F 9/542; G06Q 10/06; G06Q 10/0631; G06T 13/20; G06K 9/00335; G06K 9/6232

See application file for complete search history.

(56) References Cited

U.S. PATENT DOCUMENTS

| | | | | |
|---|---|---|---|---|
| 2009/0006166 | A1* | 1/2009 | Do | G06Q 10/06 705/7.36 |
| 2010/0114633 | A1* | 5/2010 | Sislak | G06Q 10/047 701/120 |
| 2013/0249905 | A1 | 9/2013 | Matthews et al. | |
| 2014/0365404 | A1 | 12/2014 | Bart et al. | |
| 2016/0379168 | A1* | 12/2016 | Foerster | G06Q 10/08355 705/7.16 |

OTHER PUBLICATIONS

Barták et al., "On Modeling Planning Problems: Experience from the Petrobras Challenge," Advances in Soft Computing and Its Applications, 2013, pp. 466-477, LNAI 8266, Springer-Verlag, Berlin, Heidelberg.

Helmert et al., "The Fast Downward Planning System," Journal of Artificial Intelligence Research, 2006, p. 191-246, vol. 26, AI Access Foundation.

Hoffmann et al., "The FF Planning System: Fast Plan Generation Through Heuristic Search," Journal of Artificial Intelligence Research, 2001, p. 253-302, vol. 14, AI Access Foundation and Morgan Kaufmann Publishers.

Katz et al., "Mercury Planner: Pushing the Limits of Partial Delete Relaxation," Eighth International Planning Competition (IPC), Deterministic Part, 2014, 5 Pages.

Mell et al., "The NIST Definition of Cloud Computing," National Institute of Standards and Technology, Sep. 2011, p. 1-3, Special Publication 800-145.

Rao et al., "An Object-Oriented Modeling and Implementation of Spatio-Temporal Knowledge Discovery System," International Journal of Computer Science & Information Technology (IJCSIT), Apr. 2011, p. 61-76, vol. 3, No. 2.

Richter et al., "The LAMA Planner: Guiding Cost-Based Anytime Planning with Landmarks," Journal of Artificial Intelligence Research, 2010, 127-177, vol. 39, AI Access Foundation.

Ridder et al., "Heuristic Evaluation Based on Lifted Relaxed Planning Graphs," Proceedings of the Twenty-Fourth International Conference on Automated Planning and Scheduling, 2014, p. 244-252, Association for the Advancement of Artificial Intelligence.

Seifert, "Collaborative Assistance with Spatio-Temporal Planning Problems," Spatial Cognition V Reasoning, Action, Interaction, 2007, p. 90-106, LNAI 4387, Springer-Verlag, Berlin, Heidelberg.

Seifert, "On Modeling of Large-Scale Environments for Solving Spatio-Temporal Planning Problems," GIScience Workshop on the Cognitive Approach to Modeling Environments (CAME'06), Sep. 20, 2006, p. 49-55, Münster, Germany.

* cited by examiner

US 10,635,982 B2

OPTIMIZING SPATIOTEMPORAL COMPUTATIONAL PROBLEMS

FIELD OF INVENTION

The present invention relates generally to the field of computing, and more particularly to artificial intelligence planning problems.

BACKGROUND

Automated planning and scheduling relates to an area of artificial intelligence planning concerning strategies or sequences of actions. Domain models may be conceptual models used to incorporate both behaviors and data. Additionally, domain models may be used to solve problems related to the data. Domain models of planning problems may be created offline when the environment is known.

SUMMARY

According to one embodiment, a method for solving a plurality of spatiotemporal planning problems. The method may include creating a domain model. The method may also include assigning a solution bound associated with the created domain model to infinity. The method may further include calculating a solution to the created domain model based on the assigned solution bound using at least one of a best-first search algorithm. The method may also include updating the assigned solution bound based on the calculated solution. The method may further include presenting the calculated solution to a user based on the updated solution bound not equaling infinity.

According to another embodiment, a computer system for solving a plurality of spatiotemporal planning problems. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The computer system may include creating a domain model. The computer system may also include assigning a solution bound associated with the created domain model to infinity. The computer system may further include calculating a solution to the created domain model based on the assigned solution bound using at least one of a best-first search algorithm. The computer system may also include updating the assigned solution bound based on the calculated solution. The computer system may further include presenting the calculated solution to a user based on the updated solution bound not equaling infinity.

According to yet another embodiment, a computer program product for solving a plurality of spatiotemporal planning problems. The computer program product may include one or more computer-readable storage devices and program instructions stored on at least one of the one or more tangible storage devices, the program instructions executable by a processor. The computer program product may include program instructions to create a domain model. The computer program product may also include program instructions to assign a solution bound associated with the created domain model to infinity. The computer program product may further include program instructions to calculate a solution to the created domain model based on the assigned solution bound using at least one of a best-first search algorithm. The computer program product may also include program instructions to update the assigned solution bound based on the calculated solution. The computer program product may further include program instructions to present the calculated solution to a user based on the updated solution bound not equaling infinity.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description.

DETAILED DESCRIPTION

Figure 1:
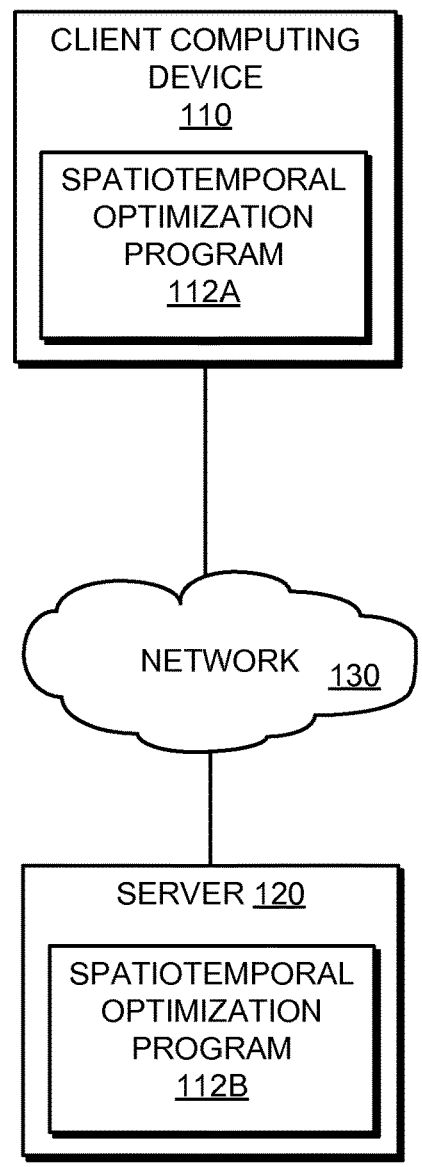
FIG. 1 is an exemplary networked computer environment, in accordance with one embodiment of the present invention.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention are related to the field of computing, and more particularly to artificial intelligence planning problems. The following described exemplary embodiments provide a system, method, and program product to, among other things, model and solve spatiotemporal planning problems using object oriented programming to provide system optimization. Therefore, the present embodiment has the capacity to improve the technical field of modeling artificial intelligence planning problems by implementing native support for spatiotemporal problems that, traditionally, prohibit the use of planning methods in mobile solutions. Additionally, native support for spatiotemporal planning problems may allow larger, more complicated planning problems to be modelled and solved by a computer.

As previously described, automated planning and scheduling relates to an area of artificial intelligence (AI) planning concerning strategies or sequences of actions, such as the travelling salesman problem. Domain models may be conceptual models used to incorporate both behaviors and data. Additionally, domain models may be used to solve problems related to the data. Models for planning problems may be created by an optimization expert offline when the environment is known. However, if an environment is unknown, dynamic modeling of a plan may be required. For example, if a delivery truck driver is only given the destination of the next package once the previous package has been delivered, then a cumulative route for all package deliveries in a day may not be preplanned and each route must be dynamically calculated from the delivery truck's current location. Typically, an iterative trial and error process is implemented in artificial intelligence until a solution is determined. Using encoding languages, such as planning domain definition language (PDDL), an optimization expert may create a model for each specific planning problem. For example, a logistical problem involving delivery trucks moving packages from one place to another may be modeled differently than a carpooling problem where a driver is picking up coworkers and driving to a common destination.

During the modeling process, a domain may encounter various states. For example, if a delivery truck driver is responsible for delivering two packages (i.e. package A and package B), there may be a state associated with the domain when the driver delivers package A first but before the delivery of package B. Similarly, a different state may be associated with the domain when the driver has delivered both package A and package B. However, another state may be associated with the domain model should the driver deliver package B first. Depending on the number of possible states within a domain model, numerous solutions may be feasible for the domain model.

Typically, many methods of modeling planning problems may require scientific expertise in first order logic-based languages, such as PDDL, and a deep understanding of advanced algorithms used to solve such models. Modeling such planning problems may become an even greater challenge when spatiotemporal problems are involved since no native support may exist for such feature in existing programming languages. Modeling of planning problems with spatial and temporal aspects may be responsible for a great portion of the grounded problem description. Therefore, many state-of-the-art planning programs may be incapable of solving sufficiently large planning problems directly. Second, spatial and temporal aspects may be extremely complicated to model in using classical planning methods. As such, it may be advantageous, among other things, to implement a method that may provide native support for modeling and solving spatiotemporal planning problems using representation state transfer (REST) and Java-based libraries and application programming interfaces (APIs) to enable easier integration into mobile business solutions, thus improving mobile developer productivity.

According to one embodiment, an object-oriented programming approach may be utilized to model and solve spatiotemporal AI planning problems since object-oriented programming may allow developers of mobile applications to create native and intuitive problem models. Additionally, object oriented programming may permit heuristic guidance to developers based on spatial and temporal information. Therefore, object oriented programming may automatically create the spatial and temporal aspects of a program for a developer. This approach may allow the developer to focus on other aspects of program development. By handling the spatial and temporal aspects of the programming process, the present embodiment may remove the developer's burden of modeling these areas and, to some extent, the issue of ground planning tasks, which is a step required by many planning programs.

When modelling spatiotemporal planning problems, developers may create new entities or existing entities may be extended to apply to the specific planning problem at hand. Developers may also utilize actions within the modelling process. Actions involving spatial entities and actions that involve temporal entities may be referred to as spatial and temporal, respectively. Temporal actions may implement an additional method, getApplicableTime, which may return the earliest time the action may be applied. The getApplicableTime method may exploit, among other things, the information encoded by the spatiotemporal constraints. In order to remove the burden of the spatial and temporal aspects from a developer, three spatiotemporal actions may be applied, such as Move, SwitchLocation, and ReduceLocation. Move, SwitchLocation, and ReduceLocation may be responsible for moving a mobile entity, loading a spatial entity into the mobile entity, and unloading a mobile entity from its current location, respectively. The applicability of the Move, SwitchLocation, and ReduceLocation actions may depend, among other things, on the provided spatiotemporal constraints. Furthermore, if the Move, SwitchLocation, and ReduceLocation actions do not fit developer needs, the developer may introduce new actions by either extending the Move, SwitchLocation, and ReduceLocation actions or creating new actions.

In order to solve spatiotemporal planning problems, a solver, designed to specifically handle spatial and temporal aspects, may be capable of exploiting the features introduced above. Implementing a heuristic, forward search-based solver may accomplish the goal of modeling planning problems that include spatial and temporal aspects. A vital component of a heuristic search solver may be a successor generator function capable of returning a list of all successors for a given state. To accomplish this return, a list of parameter types for a given action may be iterated over all possible corresponding lists of entities from the given state (i.e. state s). For each such list of parameters (i.e. params), if the isApplicable method at state s given params (i.e. isApplicable(s,params)) is true, then a successor state may be obtained by creating a copy of state s (i.e. state s') and applying the apply method (i.e. apply(s', params). The resulting successor state may be the result of the given state once the parameters have been applied.

Many heuristic search-based planning systems may implement a form of a best-first search algorithm. A best-first search algorithm may be a family of search algorithms that analyze a graph by expanding the most promising node on the graph as chosen according to a specified rule. Specific algorithms within the best first search algorithm family may vary depending on the greediness of the solution quality guarantee. The family of best first search algorithms may include greedy best-first search algorithms, A* algorithms, and weighted A* algorithms. A greedy best-first search algorithm may give no guarantee on the quality of the solution. An A* algorithm may promise that the obtained solution is the optimal solution. Weighted A* algorithms may promise that the obtained solution is optimal based on a weight factor used by the algorithm. Weighted A* with a weight w may promise that the solution returned is w-optimal. W-optimal may mean the solution is up to w times larger than optimal. For example, if w=10, the solution may be no more than 10 times larger than optimal.

A dead end detection mechanism may also be introduced. The dead end detection mechanism may validate that each mobile entity can reach each unvisited location with temporal constraints defined within the temporal bounds.

Since the spatial and temporal aspects of the heuristic may be automatically generated, the developer may focus on the domain-specific aspects. The developer may implement an evaluate(s) method that receives a state s and returns a number representing an estimate of the cost of the domain-specific part of the solution.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to model and solve spatiotemporal planning problems using object oriented programming to provide system optimization. According to at least one implementation, the present embodiment may receive domain information from a user (i.e. domain entities) actions within the domain, parameters associated with each action, and domain goals, in order to create a domain model. A solver may then model the spatial and temporal aspects associated with the planning problem through the application of best-first search and A* algorithms. The modeled spatial and temporal aspects may be combined with other domain aspects modeled by a developer to create a solution to the planning problem.

Referring to FIG. 1, an exemplary networked computer environment 100 is depicted, in accordance with one embodiment. The networked computer environment 100 may include client computing device 110 and server 120 interconnected via communication network 130. According to at least one implementation, networked computer environment 100 may include a plurality of client computing devices 110 and server 120, only one of each being shown for illustrative brevity.

Communication network 130 may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 110 may be, for example, a mobile device, a telephone, a personal digital assistant, a netbook, a laptop computer, a tablet computer, a desktop computer, or any type of computing device capable of running a program and accessing a network. Client computing device 110 may be capable of hosting spatiotemporal optimization program 112A, 112B, and communicating with server 120 via network 130, in accordance with one embodiment of the invention. As will be discussed with reference to FIG. 6, client computing device 110 may include internal components 602a and external components 604a, respectively.

Server computer 120, or database server, may be a laptop computer, netbook computer, personal computer (PC), a desktop computer, or any programmable electronic device capable of hosting spatiotemporal optimization program 112A, 112B, and communicating with client computing device 110 via network 130, in accordance with embodiments of the invention. As will be discussed with reference to FIG. 6, server computer 120 may include internal components 602b and external components 604b, respectively. Server 120 may also operate in a cloud computing service model, such as Software as a Service (SaaS), Platform as a Service (PaaS), or Infrastructure as a Service (IaaS). Server 120 may also be located in a cloud computing deployment model, such as a private cloud, community cloud, public cloud, or hybrid cloud.

According to the present embodiment, spatiotemporal optimization program 112A, 112B may be a program capable of modeling and solving spatial and temporal aspects of planning problems based on domain characteristics. Spatiotemporal optimization program 112A, 112B may include spatiotemporal successor generator 202, goal test module 204, spatiotemporal search guidance module 206, and iterative informed search module 208. Spatiotemporal optimization program 112A, 112B is explained in further detail below with respect to FIG. 2, FIG. 3, and FIG. 4.

Figure 2:
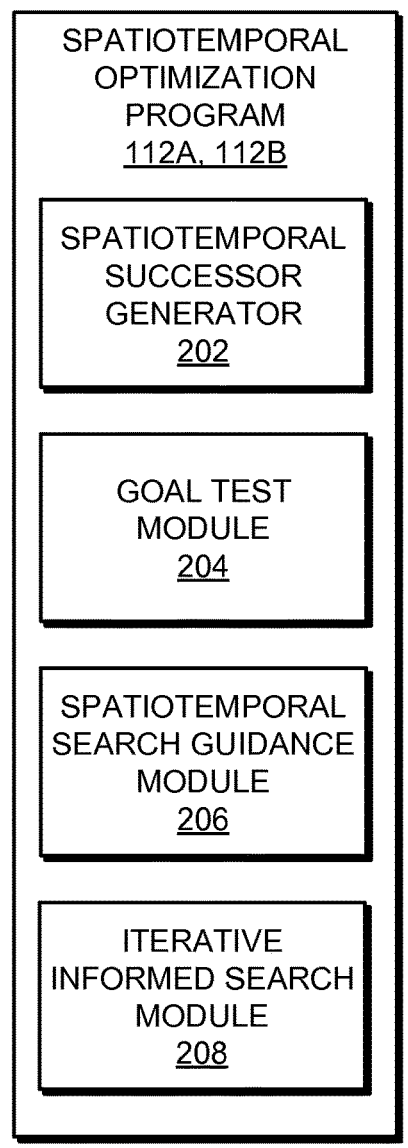
FIG. 2 is a functional block diagram of a program to model and solve spatiotemporal planning problems, in accordance with one embodiment of the present invention.

Referring now to FIG. 2, a functional block diagram 200 of a program to model and solve spatiotemporal planning problems is depicted, in accordance with one embodiment of the present invention. As previously described, spatiotemporal optimization program 112A, 112B may include spatiotemporal successor generator 202, goal test module 204, spatiotemporal search guidance module 206, and iterative informed search module 208. Spatiotemporal successor generator 202, goal test module 204, spatiotemporal search guidance module 206, and iterative informed search module 208 may be utilized by spatiotemporal optimization program 112A, 112B to model and solve planning problems that include spatial and temporal aspects.

According to the present embodiment, spatiotemporal successor generator 202 may be a program capable of receiving a domain model that includes entities, actions, boundaries, and domain goals. Using the received domain model, spatiotemporal successor generator 202 may produce a collection of possible successor situations, or states. Spatiotemporal successor generator 202 may implicitly define the graph of all reachable states. Spatiotemporal successor generator 202 may implement partial grounding of the domain model. Grounding may be instantiations of the parameterized actions by all possible entities satisfying the parameters. When spatiotemporal planning problems are handled, grounding may include the temporal and spatial aspects of the problem. Typically, full grounding may be infeasible for a realistic size problem since full grounding may be burdensome on system resources due to the vast number of processes to be calculated and analyzed. Therefore, spatiotemporal optimization program 112A, 112B may only perform a partial grounding procedure to determine a solution to the domain model. Spatiotemporal optimization program 112A, 112B may ground all non-spatial and non-temporal aspects of the problem while leaving the spatial and temporal aspects ungrounded.

Goal test module 204 may be a program capable of receiving a node and determining whether the received node satisfies a goal of the domain model. If a node is determined to satisfy a goal of the domain model, goal test module 204 may designate the node as a goal node, or goal state.

Spatiotemporal search guidance module 206 may be a heuristic function capable of receiving a state, or node, and calculating a numerical value to the state. The numerical value assigned to the received state by spatiotemporal search guidance module 206 may represent a solution cost of the received state. In conjunction with iterative informed search module 208, spatiotemporal search guidance module 206 may identify a path that leads from an initial state of the domain model to a goal node. Spatiotemporal search guidance module 206 may be automatically generated from the planning problem description. Spatiotemporal search guidance module 206 may be based on a fast forward (FF) heuristic. An FF heuristic may be a function that maps states into integer numbers thereby giving a state that value of some non-optimal solution to the delete-relaxed problem with an initial state, s. In contrast to a traditional FF heuristic, which may require full grounding, spatiotemporal search guidance module 206 may not ground the spatial and temporal aspects of a spatiotemporal planning problem since spatiotemporal optimization program 112A, 112B may model spatiotemporal aspects. Additionally, spatiotemporal search guidance module 206 may consider the spatial and temporal aspects of the same entity together and, therefore, do not relax the delete effects resulting from their interactions.

Iterative informed search module 208 may be a program capable of executing a sequence of calls to a general bounded best-first search procedure. Iterative informed search module 208 may receive, as input criteria, an initial state, and a bound on the solution cost (i.e. the maximum value a solution cost may be). Iterative informed search module 208 may produce a solution whose solution cost may be given as a bound to the next procedure call. In conjunction with spatiotemporal successor generator 202, goal test module 204, and spatiotemporal search guidance module 206, iterative informed search module 208 may identify a path that leads from an initial state of the domain model to a goal node.

Figure 3:
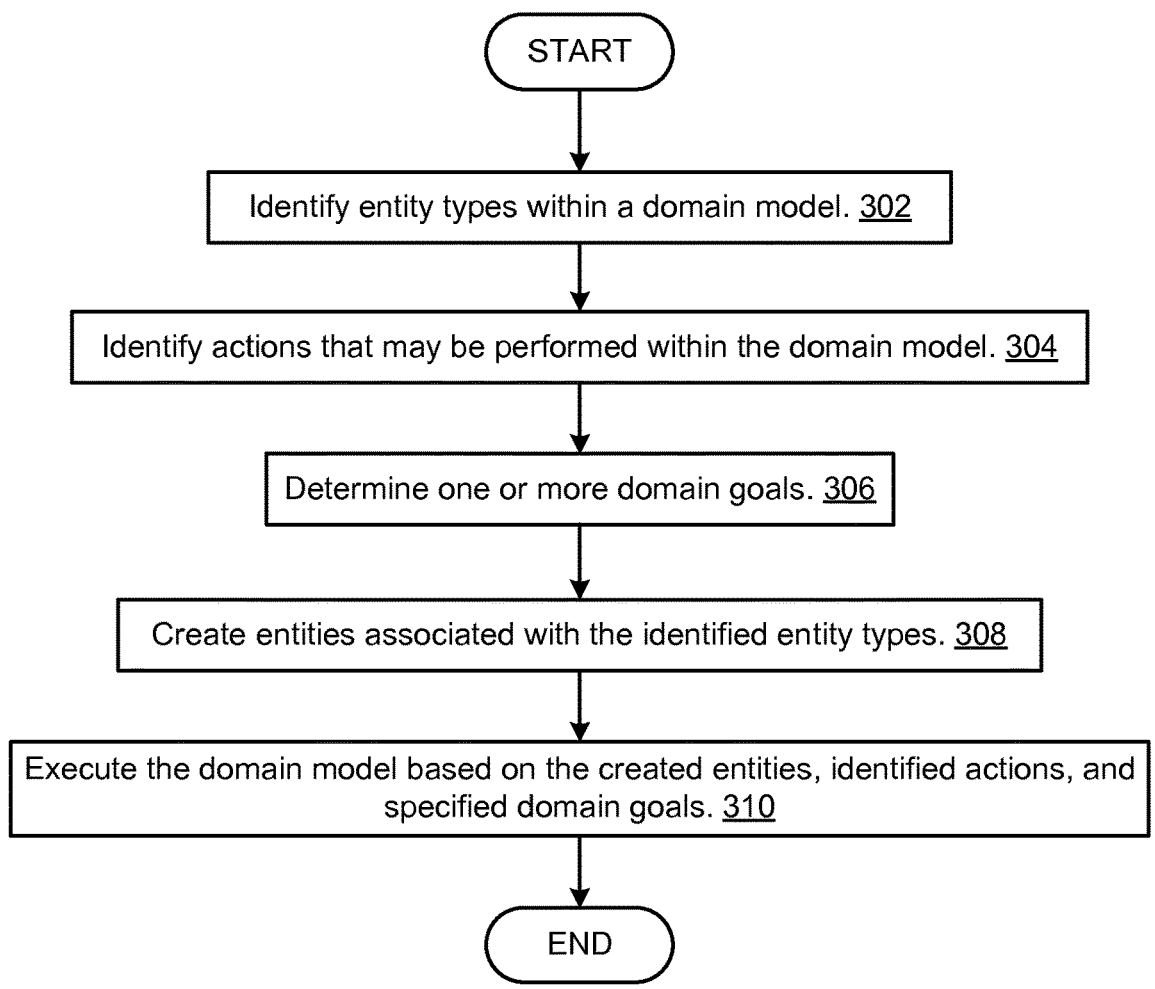
FIG. 3 illustrates a flowchart of the operational steps carried out by a program to create a domain model of spatiotemporal planning problems, in accordance with one embodiment of the present invention.

Referring now to FIG. 3, a flowchart 300 of the operational steps carried out by a program to create a domain model of spatiotemporal planning problems is depicted, in accordance with one embodiment of the present invention. At 302, when an API associated with spatiotemporal optimization program 112A, 112B is initialized, spatiotemporal optimization program 112A, 112B may identify entity types within a domain model. Planning problems may be modeled using an object-oriented approach that may allow developers to define and use entities (i.e. objects). The entities may be separated into classes, or types, in an object-oriented language, such as Java, Python, C++, Visual Basic .NET, and Ruby. The set of developer defined entities may, cumulatively, describe the AI planning problem. For example, for the modelling of a planning problem corresponding to a carpool involving three coworkers, spatiotemporal optimization program 112A, 112B may identify the entity types as participant and vehicle since the entities involved in the planning problem are the driver and his/her coworkers and the driver's vehicle. Furthermore, each set of developer defined entity types may include a set of parameters, or characteristics, such as atomic type, a set of actions, an initial state of each entity, and a goal test class. For example, "color" may be a property of a vehicle entity type. Each parameter may be assigned an initial value, which may define the initial state of the entity. Additionally, each action may include a set of parameters delineating when the action may be performed. The association between entities and actions may be given by a list of parameters each action has associated with a particular entity type. Furthermore, spatiotemporal optimization program 112A, 112B may identify entity types through data entry or selection by a user.

Two special types of entities (i.e. spatial and temporal) may be introduced to aid in the modeling and solving of planning problems with spatial and temporal aspects. Each entity defined by a mobile developer may extend to one, or both, of the spatial or temporal entity types. Additionally, the spatial and temporal entity types may have specific entity types, or sub-entities, that may be classified within each entity type. For example, a mobile specific entity type may be introduced that extends to both the spatial and temporal types. Similarly, a place specific entity type may be introduced that extends to only the spatial entity type. For specific entity types that are spatiotemporal, such as the mobile specific entity type, specification of a list of spatiotemporal constraints may be allowed. The constraints may encode temporal restrictions on visiting locations, such as when locations may be visited by the mobile entity, based on four bounds (i.e. earliest arrival time, latest arrival time, earliest departure time, and latest departure time). One of the constraints may be marked as a final constraint that specifies a spatiotemporal goal. For each location, the list of constraints may be completely disjointed in time and visits to each location may be encoded according to the constraints. Furthermore, if a location is visited according to the list of constraints, the location may not be subsequently revisited.

Next at 304, spatiotemporal optimization program 112A, 112B may identify actions that may be performed within the domain model. For example, in the carpooling planning problem described above, an action within the domain model may be "boarding vehicle". The "boarding vehicle" action may be associated with the participant entity type since only participants may enter a vehicle. Furthermore, an action may be associated with more than one entity type. For example, a "drive to destination" action may be associated with a participant entity type and a vehicle entity type since the participant may drive the vehicle to a destination location and the vehicle may be driven to the destination location. Additionally, actions may be associated with parameters corresponding to an entity type at the modeling level. In this sense, actions may be defined as classes with an isApplicable method and an apply method, describing when the action is applicable and the result of the action's application. For example, the "boarding vehicle" action may have parameters requiring a participant entity type be within a specified distance of a vehicle entity type in order to execute the "boarding vehicle" action. The isApplicable method attached to this action may include the criteria that the driver is at the same location as the vehicle at the same time and that the vehicle is stopped. The apply method may be "driver sits in vehicle's driver seat" and may only be executed when all criteria under the isApplicable method are satisfied. Furthermore, a goal test may be defined as a class with a method check that determines if an action may be performed according to the parameters. If the parameters are satisfied, the action may be performed. If the parameters are not satisfied, the action may not be performed. The developer may specify the types, or classes, of entities that may pass to the methods as parameters.

As previously described, actions involving spatial entities and actions that involve temporal entities may be referred to as spatial and temporal, respectively. Temporal actions may implement an additional method, getApplicableTime, which may return the earliest time the action may be applied. The getApplicableTime method may exploit, among other things, the information encoded by the spatiotemporal constraints. In order to remove the burden of the spatial and temporal aspects from a developer, three spatiotemporal actions may be applied, such as Move, SwitchLocation, and ReduceLocation. Move, SwitchLocation, and ReduceLocation may be responsible for moving a mobile entity, loading a spatial entity into the mobile entity, and unloading a mobile entity from its current location, respectively. The applicability of the Move, SwitchLocation, and ReduceLocation actions may depend, among other things, on the provided spatiotemporal constraints. Furthermore, if the Move, SwitchLocation, and ReduceLocation actions do not fit developer needs, the developer may introduce new actions by either extending the Move, SwitchLocation, and ReduceLocation actions or creating new actions.

Furthermore, spatiotemporal optimization program 112A, 112B may identify actions through data entry or selection by a user. Additionally, the methods may be considered black boxes, since a developer may not be limited in the actual implementation of the methods. A goal test may be defined as a class with a method check. The developer may specify the types, or classes, of entities that may pass to the methods as parameters.

Then at 306, spatiotemporal optimization program 112A, 112B may determine one or more domain goals. Once the entity types and actions have been identified, spatiotemporal optimization program 112A, 112B may determine one or more domain goals to achieve when solving the domain model. For example, in the carpooling planning problem described above, spatiotemporal optimization program 112A, 112B may determine the domain goal is to have a driver participant pick up each passenger participant and arrive at a work destination by a specified time.

Next at 308, spatiotemporal optimization program 112A, 112B may create entities associated with the identified entity types. Once the entity types, actions, and domain goals are established, spatiotemporal optimization program 112A, 112B may actually create the entities associated with each entity type. For example, in the previously described situation involving a carpooling model that includes a driver and coworkers riding to work together where the driver must drive a vehicle to each of the coworkers' homes before traveling to work, spatiotemporal optimization program 112A, 112B may create corresponding entities for the domain model. One entity created by spatiotemporal optimization program 112A, 112B may be titled "driver vehicle" and may be of the vehicle entity type. Furthermore, participant entities may be created to represent the driver and the coworkers. The participant entities may be titled "driver", "coworker A" and "coworker B". Additionally, whereas the establishment of the entity types, actions, and domain goals may be performed once per domain, spatiotemporal optimization program 112A, 112B may create the entities associated with the domain model each time a user wishes to solve an updated instance of the domain. For example, if the domain changes to include four coworkers that need to be picked up by a driver before the driver may proceed to a work destination, the entity types, actions, and domain goal may remain the same as the previously described hypothetical situation involving only three coworker passengers. However, spatiotemporal optimization program 112A, 112B may create a new set of entities to allow for proper solution optimization of the domain model in order to account for a forth coworker passenger.

Then at 310, spatiotemporal optimization program 112A, 112B may execute the domain model using iterative informed search module 208 based on the created entities, identified actions, and determined domain goals. When executing the domain model, spatiotemporal optimization program 112A, 112B may implement iterative informed search module 208 to solve and optimize a solution for the domain model. The process of solving and optimizing the domain model by spatiotemporal optimization program 112A, 112B is explained in further detail below with respect to FIG. 4.

Figure 4:
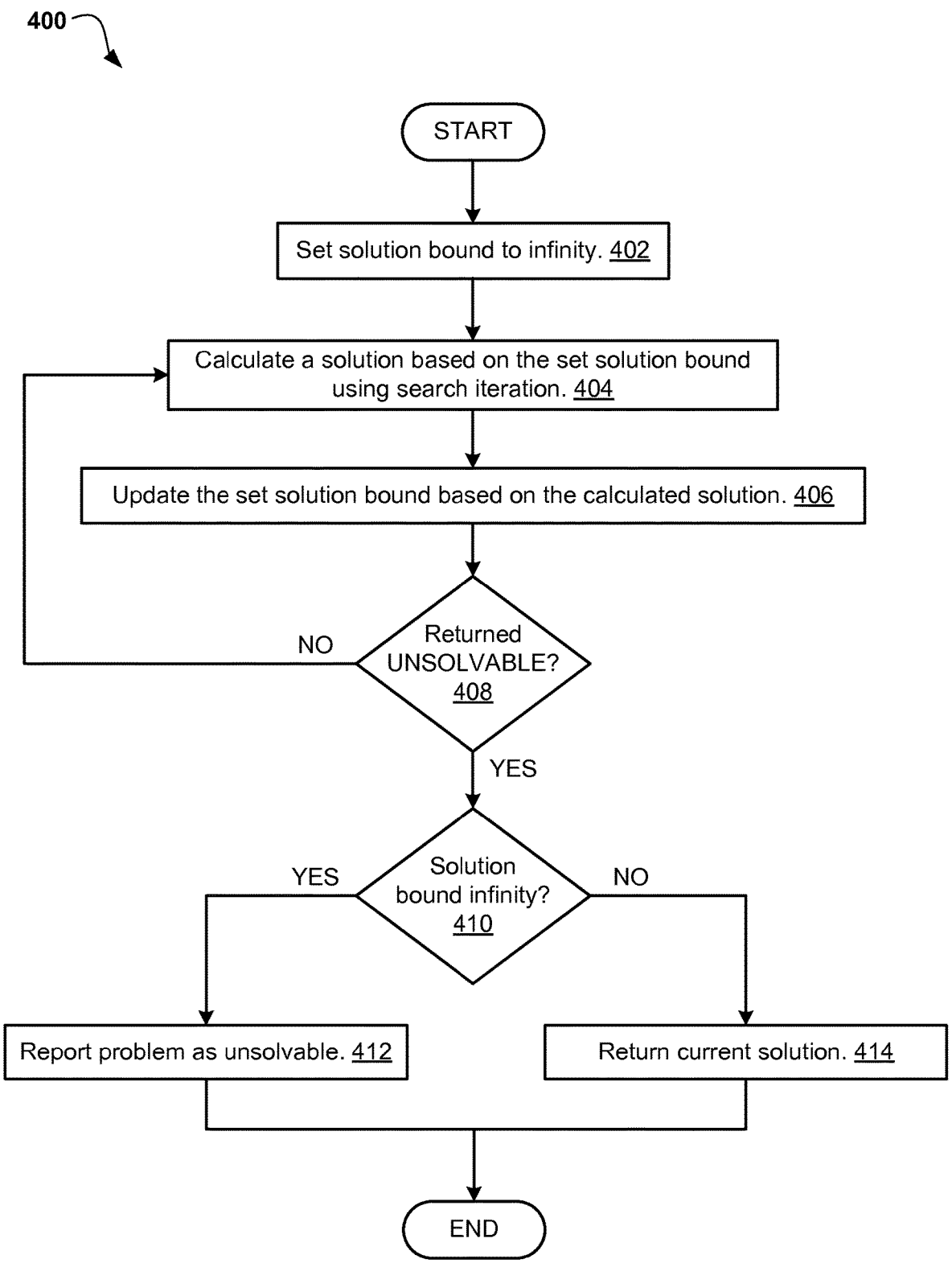
FIG. 4 illustrates a flowchart of the operational steps carried out by a program when executing a domain model in order to iteratively solve and optimize spatiotemporal planning problems, in accordance with one embodiment of the present invention.

Referring now to FIG. 4, a flowchart 400 of the operational steps carried out by a program when executing a domain model in order to iteratively solve and optimize spatiotemporal planning problems is depicted, in accordance with one embodiment of the present invention. At 402, spatiotemporal optimization program 112A, 112B may set the solution bound of the domain model to infinity. The solution bound may be the cost of identifying a solution to the domain model. As previously described, a solution is a sequence of operator steps that traverses a domain model from an initial state to a goal state. When the solution bound is set to infinity, spatiotemporal optimization program 112A, 112B may consider all possible solutions to reaching a goal state from an initial state within the domain model. Additionally, the solution bound may be a representation of a quantitative factor, such as monetary amount, time, distance, size, or total count. Therefore, spatiotemporal optimization program 112A, 112B may proceed through an iterative process to refine the steps within a solution to determine a best fit solution for the domain model. For example, in a carpooling example, the carpool of coworkers may have a solution bound of arrival at the destination location by a specific time of day.

Next at 404, spatiotemporal optimization program 112A, 112B may calculate a solution based on the set solution bound using search iteration. At different stages of the iterative search, spatiotemporal optimization program 112A, 112B may utilize spatiotemporal successor generator 202, goal test module 204, and spatiotemporal search guidance module 206. The process of calculating a solution to the domain model based on the set solution bound using search iteration is described in further detail with respect to FIGS. 5A-5B.

Then at 406, spatiotemporal optimization program 112A, 112B may update the set solution bound based on the calculated solution. Once a solution to the domain model has been calculated, spatiotemporal optimization program 112A, 112B may determine whether the calculated solution is the best solution to the domain model. In order to determine whether the calculated solution is the best solution to the domain model, spatiotemporal optimization program 112A, 112B may change the solution bound to reflect the calculated solution. Therefore, the new solution bound may be based on the calculated solution. For example, in the previously described carpooling example, spatiotemporal optimization program 112A, 112B may calculate a solution path that takes the carpool one hour to be completed when an initial solution bound is set to infinity. In order to determine if more efficient solutions exist that may be completed in less than one hour, spatiotemporal optimization program 112A, 112B may update the solution bound to reflect the amount of time required to complete the process in the calculated solution. Furthermore, if spatiotemporal optimization program 112A, 112B determines the solution is unsolvable in step 404, spatiotemporal optimization program 112A, 112B may update or keep the solution bound set to infinity.

Next at 408, spatiotemporal optimization program 112A, 112B may determine if the returned solution is unsolvable under the updated solution bound. According to one implementation, the method may continue along operational flowchart 400, if the problem is unsolvable under the updated solution bound. If spatiotemporal optimization program 112A, 112B determines the solution bound makes the problem unsolvable (step 408, "YES" branch), spatiotemporal optimization program 112A, 112B may continue to step 410 to determine if the solution bound is set to the initial solution bound of infinity. If spatiotemporal optimization program 112A, 112B determines the solution bound does not make the problem unsolvable (step 408, "NO" branch), spatiotemporal optimization program 112A, 112B may return to step 404 to calculate a solution based on the set solution bound using search iteration.

Spatiotemporal optimization program 112A, 112B may determine that a solution is unsolvable under a current solution bound if no solution exists that satisfies the solution bound. For example, if a calculated solution of a carpool determines all passengers can be picked up and arrive at the destination within one hour, then the new solution bound may be set to one hour. If spatiotemporal optimization program 112A, 112B is unable to calculate a solution to the domain model that can be completed in under one hour, then spatiotemporal optimization program 112A, 112B may determine that the domain model is unsolvable under the solution bound. Therefore, spatiotemporal optimization program 112A, 112B may determine that the calculated solution completed in one hour is the best solution to the domain model.

Then at 410, spatiotemporal optimization program 112A, 112B may determine if the solution bound is set to infinity. According to one implementation, the method may continue along operational flowchart 400, if the solution bound is set to infinity. If spatiotemporal optimization program 112A, 112B determines the solution bound is set to infinity (step 410, "YES" branch), spatiotemporal optimization program 112A, 112B may continue to step 412 to report the problem represented in the domain model as unsolvable. If spatiotemporal optimization program 112A, 112B determines the solution bound is not set to infinity (step 410, "NO" branch), spatiotemporal optimization program 112A, 112B may continue to step 414 to report the calculated solution to the problem represented in the domain model.

Next at 412, if spatiotemporal optimization program 112A, 112B determines the solution bound is set to the initial solution bound of infinity, spatiotemporal optimization program 112A, 112B may report the problem represented in the domain model as unsolvable. If the solution bound is set to infinity, then a real solution to the problem may not be calculable based on the parameters of the domain model. For example, in the previously described carpooling example, if the carpool must arrive at the destination location by 9:00 A.M. but the driver cannot leave home earlier than 8:00 A.M., spatiotemporal optimization program 112A, 112B may determine that the problem is unsolvable if total time of the carpool exceeds one hour. Therefore, spatiotemporal optimization program 112A, 112B may not be able to change the solution bound from the initial setting of infinity.

Then at 414, if spatiotemporal optimization program 112A, 112B determines the solution bound is not set to infinity, spatiotemporal optimization program 112A, 112B may report the current problem solution to a user. If spatiotemporal optimization program 112A, 112B changes the solution bound from the initial setting of infinity, then a solution may have been calculated. Therefore, spatiotemporal optimization program 112A, 112B may report the solution and details of the solution to a user. The planning problem solution may be accessible through a natural language interface, such as IBM® ILOG® framework (IBM ILOG and all IBM ILOG-based trademarks and logos are trademarks or registered trademarks of International Business Machines Corporation and/or its affiliates). Additionally, the solution may be used over a cloud program, such as IBM® BlueMix® (IBM BlueMix and all IBM BlueMix-based trademarks and logos are trademarks or registered trademarks of International Business Machines Corporation and/or its affiliates) and accessed via a developer friendly and intuitive REST API. Furthermore, the solution may be combined with IBM® Operation Decision Manager (ODM) Advanced® (IBM ODM Advanced and all IBM ODM Advanced-based trademarks and logos are trademarks or registered trademarks of International Business Machines Corporation and/or its affiliates) to enable continuous monitoring and orchestration of the planning and execution process.

Figure 5A:
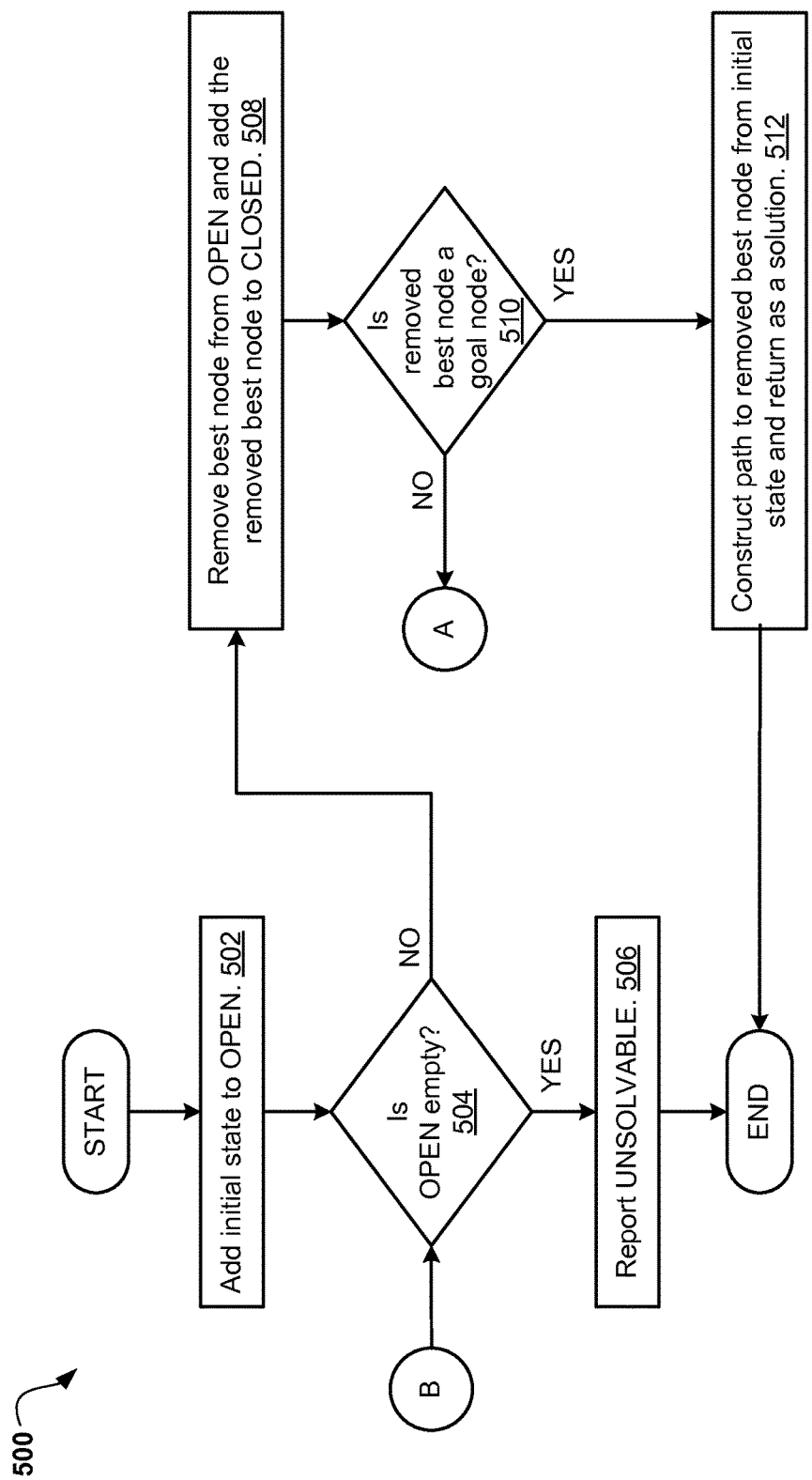
FIGS. 5A-5B illustrate a flowchart of the operational steps carried out by a program to calculate a solution to a spatiotemporal planning problem using an iterative search, in accordance with one embodiment of the present invention.
Figure 5B:
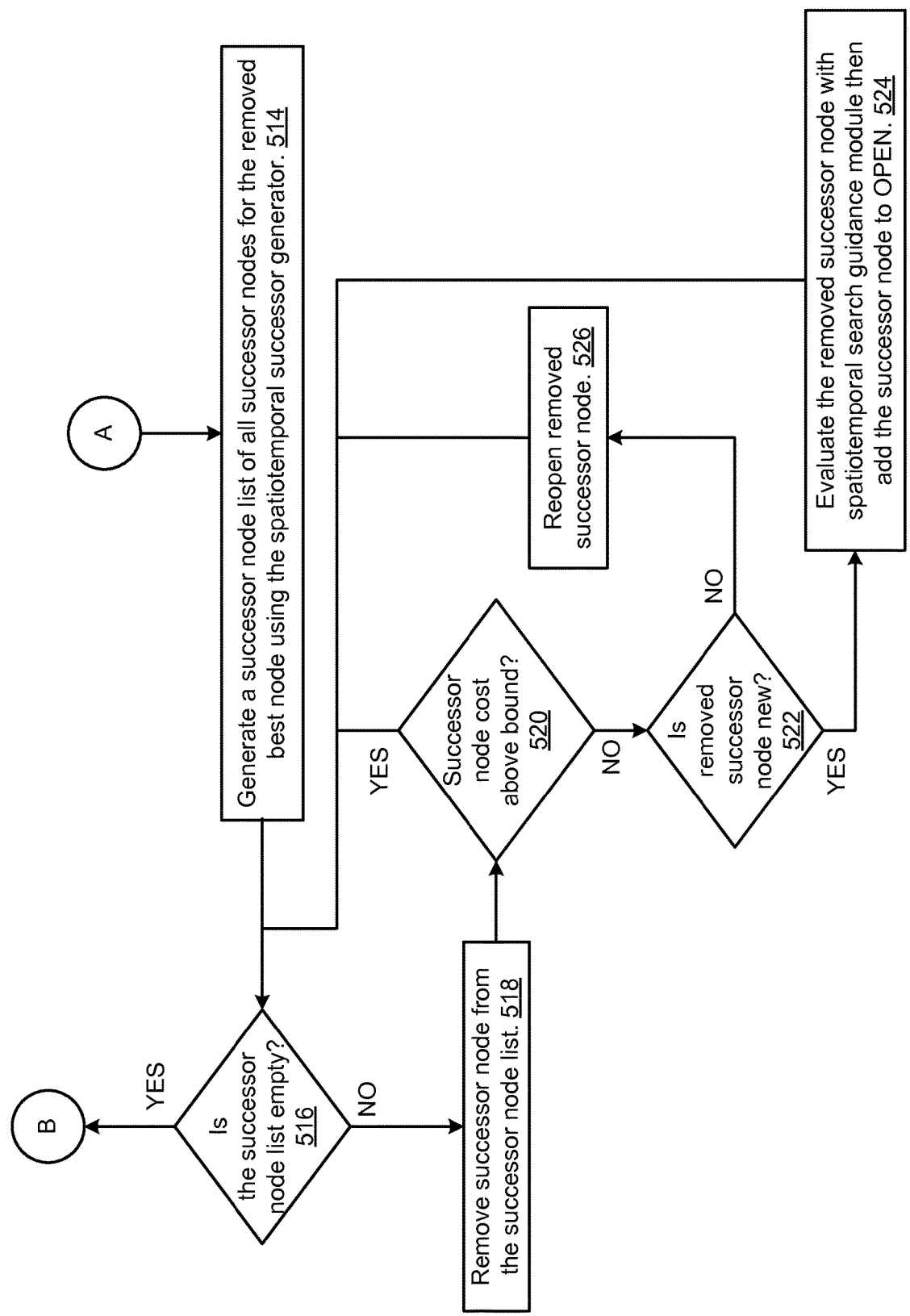

Referring now to FIGS. 5A-5B, a flowchart 500 of the operational steps carried out by a program to calculate a solution to a spatiotemporal planning problem using an iterative search is depicted, in accordance with one embodiment of the present invention. Using iterative informed search module 208, spatiotemporal optimization program 112A, 112B may calculate the solution based on a set solution bound. Referring now to FIG. 5A, at 502, spatiotemporal optimization program 112A, 112B may add an initial state to an OPEN queue. Spatiotemporal optimization program 112A, 112B may utilize queues when determining a solution to a spatiotemporal planning problem. In best-first searches, queues may be used to hold all nodes encountered by the search algorithm. The queues may be disjointed and each encountered node may be held in one of the queues. An OPEN queue may be a queue within the best-first search that holds nodes in line for examination by spatiotemporal optimization program 112A, 112B. When beginning to calculate a solution to a spatiotemporal planning problem, spatiotemporal optimization program 112A, 112B may place information regarding the initial state of the domain model into the OPEN queue. Additionally, a CLOSED queue may be a queue within the best-first search that holds nodes previously examined by spatiotemporal optimization program 112A, 112B. The CLOSED queue may hold all nodes that lay in the solution path as well as all nodes considered by spatiotemporal optimization program 112A, 112B using the best-first search algorithm. Furthermore, a previously examined node may be moved from the CLOSED queue to the OPEN queue when a better path to the node is identified and a reexamination of the node may be necessary.

Next at 504, spatiotemporal optimization program 112A, 112B may determine if the OPEN queue is empty. According to one implementation, the method may continue along operational flowchart 500, if OPEN queue is not empty. If spatiotemporal optimization program 112A, 112B determines the OPEN queue is empty (step 504, "YES" branch), spatiotemporal optimization program 112A, 112B may continue to step 506 to report the problem represented in the domain model as unsolvable. If spatiotemporal optimization program 112A, 112B determines the OPEN queue is not empty (step 504, "NO" branch), spatiotemporal optimization program 112A, 112B may continue to step 508 to remove the best node from the OPEN queue and add the removed best node to the CLOSED queue. Spatiotemporal optimization program 112A, 112B may be able to determine if the domain model is empty based on the status of the nodes within the OPEN queue. Furthermore, when spatiotemporal optimization program 112A, 112B is reviewing the domain model for the first time from the initial state, the OPEN queue may likely contain nodes since the initial state was assigned to the OPEN queue within step 502.

Then at 506, if spatiotemporal optimization program 112A, 112B determines that the domain model is unsolvable due to the OPEN queue containing no nodes, then spatiotemporal optimization program 112A, 112B may report the problem as unsolvable. If the OPEN queue is empty and the domain model has not reached a goal state, then spatiotemporal optimization program 112A, 112B may determine that the domain model is unsolvable. Upon determination that the domain model is unsolvable, spatiotemporal optimization program 112A, 112B may report such determination to the user by sending an unsolvable solution response to step 412 (FIG. 4).

Next at 508, if spatiotemporal optimization program 112A, 112B determines that the domain model is not unsolvable due to the OPEN queue containing nodes, spatiotemporal optimization program 112A, 112B may remove the best node from the OPEN queue and add the removed best node to the CLOSED queue. If a domain model is not unsolvable, spatiotemporal optimization program 112A, 112B may need to analyze each node to determine if the domain model is actually solvable. Spatiotemporal optimization program 112A, 112B may begin the analysis of the nodes in the OPEN queue by determining the best node within the OPEN queue and moving the best node to the CLOSED queue. Spatiotemporal optimization program 112A, 112B may be able to determine which node among all nodes within the OPEN queue is the best node based on an evaluation. According to a best-first search algorithm, an evaluation may be a calculated value that rates the quality of the node in reaching a solution to the domain model. The evaluation may be a value that rates the quality of the node. For example, the evaluation may be a sum of the distance of the node from the initial state and the distance of the node from the goal state.

Then at 510, spatiotemporal optimization program 112A, 112B may determine if the removed best node is a goal node by implementing goal test module 204. According to one implementation, the method may continue along operational flowchart 500, if the removed best node is a goal node. Spatiotemporal optimization program 112A, 112B may determine that the removed best node is a goal node based on the one or more determined domain goals. If spatiotemporal optimization program 112A, 112B determines removed best node is a goal node (step 510, "YES" branch), spatiotemporal optimization program 112A, 112B may continue to step 512 to reconstruct a path to the removed best node from an initial state and return the path as a solution to the domain model. If spatiotemporal optimization program 112A, 112B determines the removed best node is not a goal node (step 510, "NO" branch), spatiotemporal optimization program 112A, 112B may continue to step 514 to determine a successor state to the removed best node using spatiotemporal successor generator 202.

Next at 512, if spatiotemporal optimization program 112A, 112B determines the removed best node is a goal node, then spatiotemporal optimization program 112A, 112B may construct a path to the removed best node from the initial state and return the path as a solution to the domain model using an A* algorithm. As previously described, an A* algorithm may be a computer algorithm used in pathfinding and graph traversal that may determine an efficiently traversable path between multiple points, or nodes. Additionally, if spatiotemporal optimization program 112A, 112B determines the removed best node is a goal node, then spatiotemporal optimization program 112A, 112B may only need to determine a path from the initial state to the removed best node to identify an efficient method of solving the domain model. Once the path to the removed best node is determined, spatiotemporal optimization program 112A, 112B may return the path as a solution to the domain model.

Referring now to FIG. 5B, at 514, if spatiotemporal optimization program 112A, 112B determines the removed best node is not a goal node, spatiotemporal optimization program 112A, 112B may generate a successor node list that includes all successor states, or successor nodes, to the removed best node using spatiotemporal successor generator 202. Spatiotemporal successor generator 202 may be capable of generating the immediate successors of the removed best node. For example, if in the previously described carpooling example, the removed best node may be for the driver to enter the vehicle. Since the domain goal of the domain model is for the driver and coworkers to all arrive at the destination location, the removed best node is not a goal node. Therefore, spatiotemporal optimization program 112A, 112B may utilize spatiotemporal successor generator 202 to generate successor nodes for the removed best node of the driver entering the vehicle. The spatiotemporal successor generator 202 may generate successor nodes of the driver driving to coworker A's house, the driver driving to coworker B's house, and the driver driving immediately to the destination location. Spatiotemporal successor generator 202 may create a successor state list, or a successor node list, that includes each generated successor state to the removed best node.

Next at 516, spatiotemporal optimization program 112A, 112B may determine if the successor node list is empty. According to one implementation, the method may continue along operational flowchart 500, if the successor node list is empty. Spatiotemporal optimization program 112A, 112B may iterate through each successor node in order to determine a best fit path to a goal state. If spatiotemporal optimization program 112A, 112B determines the successor node list is empty (step 516, "YES" branch), spatiotemporal optimization program 112A, 112B may return to step 504 to determine if the domain model is unsolvable. If spatiotemporal optimization program 112A, 112B determines the successor node list is not empty (step 516, "NO" branch), spatiotemporal optimization program 112A, 112B may continue to step 518 to remove a successor node from the successor node list.

Then at 518, spatiotemporal optimization program 112A, 112B may remove a successor node from the successor node list. Spatiotemporal optimization program 112A, 112B may analyze through each successor node on the successor node list to determine which successor node is a viable option to use as a successor to the removed best node. For example, if the generated successor nodes in the previously described carpooling example are the driver driving to coworker A's house, the driver driving to coworker B's house, and the driver driving immediately to the destination location, spatiotemporal optimization program 112A, 112B may remove each successor node from the successor node list and, one at a time, review the viability of each successor node to the removed best node of the driver entering the vehicle.

Next at 520, spatiotemporal optimization program 112A, 112B may determine if the removed successor node cost is above the solution bound. According to one implementation, the method may continue along operational flowchart 500, if the removed successor node cost is not above the solution bound. If spatiotemporal optimization program 112A, 112B determines the removed successor node cost is above the solution bound (step 520, "YES" branch), spatiotemporal optimization program 112A, 112B may eliminate the removed successor node from consideration and return to step 516 to determine if the successor node list is empty. If spatiotemporal optimization program 112A, 112B determines the removed successor node cost is not above the solution bound (step 520, "NO" branch), spatiotemporal optimization program 112A, 112B may continue to step 522 to determine whether the removed successor node is a new successor node that was not previously considered.

Then at 522, spatiotemporal optimization program 112A, 112B may determine if the removed successor node is a new successor node that has not previously been evaluated. According to one implementation, the method may continue along operational flowchart 500, if the removed successor node has not previously been evaluated. If spatiotemporal optimization program 112A, 112B determines the removed successor node is new (step 522, "YES" branch), spatiotemporal optimization program 112A, 112B may continue to step 524 to evaluate the removed successor node with spatiotemporal guidance module 206. If spatiotemporal optimization program 112A, 112B determines the removed successor node is not new (step 522, "NO" branch), spatiotemporal optimization program 112A, 112B may continue to step 526 to reopen the removed successor node.

Next at 524, if spatiotemporal optimization program 112A, 112B determines the removed successor node is new, then spatiotemporal optimization program 112A, 112B may evaluate the removed successor node using spatiotemporal guidance module 206. As previously, described, an evaluation of a node may be a calculated value that rates the quality of the node in reaching a solution to the domain model. Once the removed successor node has been evaluated using spatiotemporal guidance module 206, the removed successor node may be added to the OPEN queue for further consideration along with the corresponding evaluation.

Then at 526, if spatiotemporal optimization program 112A, 112B determines the removed successor node is not new, then spatiotemporal optimization program 112A, 112B may reopen the removed successor node for consideration by moving the removed successor node from the CLOSED queue to the OPEN queue. Since a node may be reached in a domain model by traversing different paths through the domain model, a node may be previously encountered and evaluated by spatiotemporal optimization program 112A, 112B. For example, spatiotemporal optimization program 112A, 112B may have evaluated successor nodes for a driver travelling to coworker A's house and coworker B's house directly from the driver's house. Based on the calculated evaluation, spatiotemporal optimization program 112A, 112B may determine that the best node is to travel to coworker A's house. When determining a successor node once the driver has travelled to coworker A's house, spatiotemporal optimization program 112A, 112B may determine that the best node is to travel to coworker B's house. Since this node has already been evaluated by spatiotemporal optimization program 112A, 112B, the node may be reopened by spatiotemporal optimization program 112A, 112B by moving the node from the CLOSED queue to the OPEN queue. By reopening the node, spatiotemporal optimization program 112A, 112B may be able to determine whether the path used to travel to the reopened node is the best path to reach the reopened node or if a previously determined path is a more efficient path to travel to the reopened node. If spatiotemporal optimization program 112A, 112B determines the current path to the reopened node is more efficient than a previously determined path to the reopened node, then spatiotemporal optimization program 112A, 112B may update the steps of the previously determined path to the steps of the current path.

Figure 6:
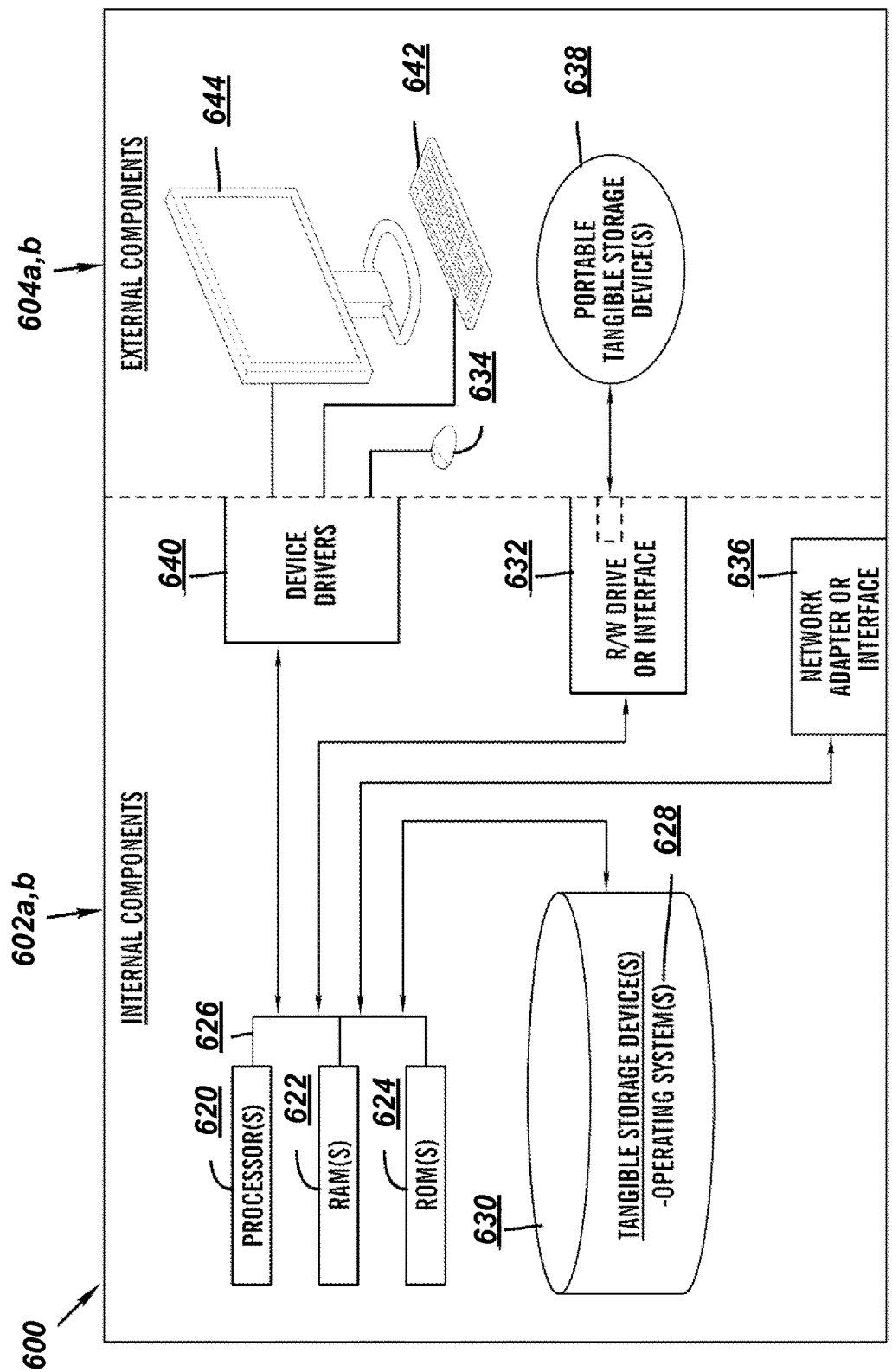
FIG. 6 depicts a cloud computing node according to an embodiment of the present invention.

FIG. 6 is a block diagram 600 of internal and external components of computer 110 and server 120 depicted in FIG. 1 in accordance with an embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

Data processing system 602, 604 is representative of any electronic device capable of executing machine-readable program instructions. Data processing system 602, 604 may be representative of a smart phone, a computer system, PDA, or other electronic devices. Examples of computing systems, environments, and/or configurations that may represented by data processing system 602, 604 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 110 and network server 120 may include respective sets of internal components 602 a,b and external components 604 a,b illustrated in FIG. 6. Each of the sets of internal components 602 include one or more processors 620, one or more computer-readable RAMs 622 and one or more computer-readable ROMs 624 on one or more buses 626, and one or more operating systems 628 and one or more computer-readable tangible storage devices 630. The one or more operating systems 628, spatiotemporal optimization program 112A in client computer 110; and spatiotemporal optimization program 112B in network server 120 are stored on one or more of the respective computer-readable tangible storage devices 630 for execution by one or more of the respective processors 620 via one or more of the respective RAMs 622 (which typically include cache memory). In the embodiment illustrated in FIG. 6, each of the computer-readable tangible storage devices 630 is a magnetic disk storage device of an internal hard drive. Alternatively, each of the computer-readable tangible storage devices 630 is a semiconductor storage device such as ROM 624, EPROM, flash memory or any other computer-readable tangible storage device that can store a computer program and digital information.

Each set of internal components 602 a,b also includes a R/W drive or interface 632 to read from and write to one or more portable computer-readable tangible storage devices 638 such as a CD-ROM, DVD, memory stick, magnetic tape, magnetic disk, optical disk or semiconductor storage device. A software program, such as spatiotemporal optimization program 112A, 112B can be stored on one or more of the respective portable computer-readable tangible storage devices 638, read via the respective R/W drive or interface 632 and loaded into the respective hard drive 630.

Each set of internal components 602 a,b also includes network adapters or interfaces 636 such as a TCP/IP adapter cards, wireless Wi-Fi interface cards, or 3G or 4G wireless interface cards or other wired or wireless communication links. Spatiotemporal optimization program 112A in client computer 110 and spatiotemporal optimization program 112B in network server 120 can be downloaded to client computer 110 and network server 120 from an external computer via a network (for example, the Internet, a local area network or other, wide area network) and respective network adapters or interfaces 636. From the network adapters or interfaces 636, spatiotemporal optimization program 112A in client computer 110 and spatiotemporal optimization program 112B in network server 120 are loaded into the respective hard drive 630. The network may comprise copper wires, optical fibers, wireless transmission, routers, firewalls, switches, gateway computers and/or edge servers.

Each of the sets of external components 604 a,b can include a computer display monitor 644, a keyboard 642, and a computer mouse 634. External components 604 *a,b* can also include touch screens, virtual keyboards, touch pads, pointing devices, and other human interface devices. Each of the sets of internal components 602 *a,b* also includes device drivers 640 to interface to computer display monitor 644, keyboard 642, and computer mouse 634. The device drivers 640, R/W drive or interface 632 and network adapter or interface 636 comprise hardware and software (stored in storage device 630 and/or ROM 624).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
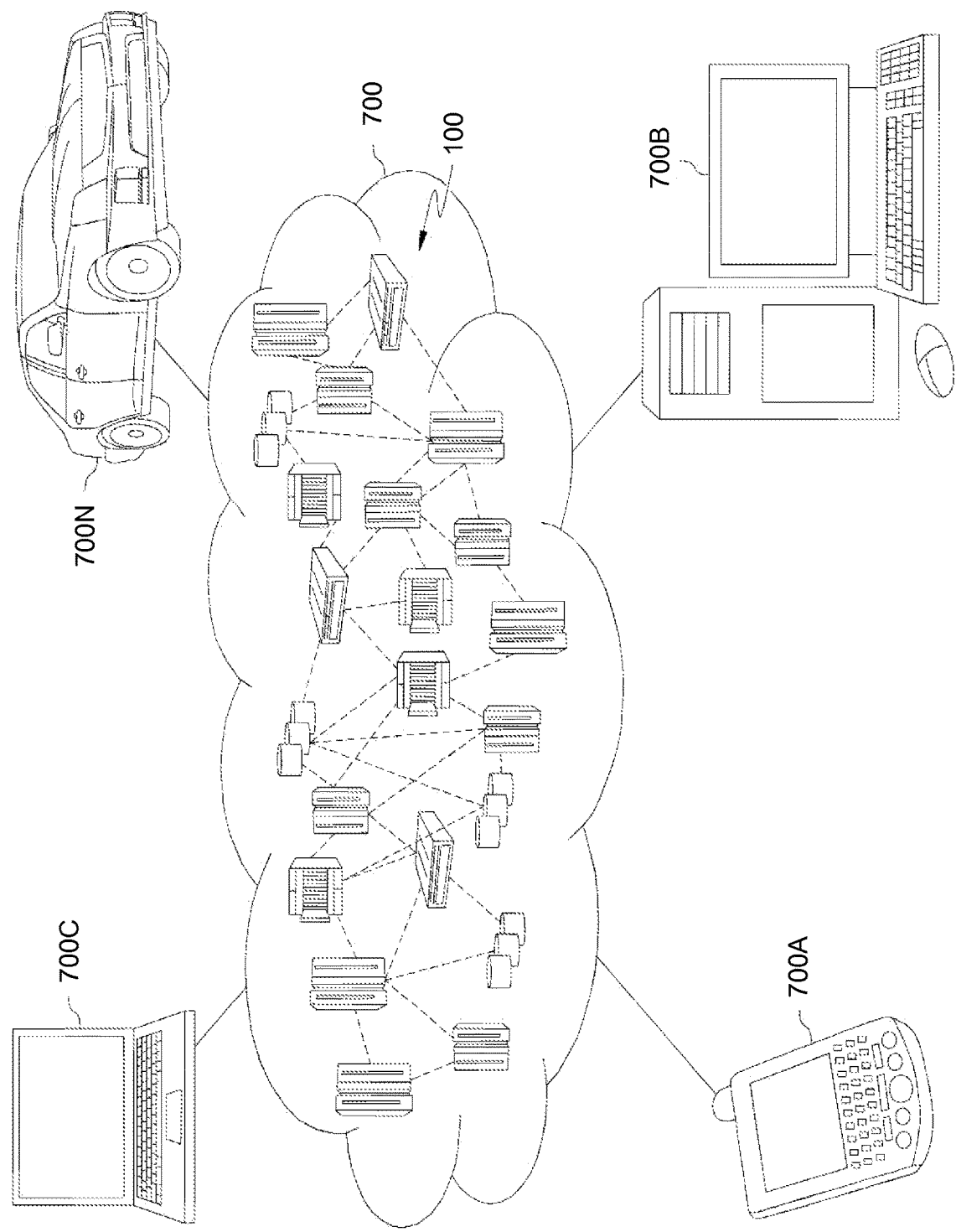
FIG. 7 depicts a cloud computing environment according to an embodiment of the present invention.

Referring now to FIG. 7, illustrative cloud computing environment 700 is depicted. As shown, cloud computing environment 700 comprises one or more cloud computing nodes 100 with which local computing devices used by cloud consumers, such as, for example, personal digital assistant (PDA) or cellular telephone 700A, desktop computer 700B, laptop computer 700C, and/or automobile computer system 700N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 700 to offer infrastructure, platforms and/or software as services for which a cloud consumer does not need to maintain resources on a local computing device. It is understood that the types of computing devices 700A-N shown in FIG. 7 are intended to be illustrative only and that computing nodes 100 and cloud computing environment 700 can communicate with any type of computerized device over any type of network and/or network addressable connection (e.g., using a web browser).

Figure 8:
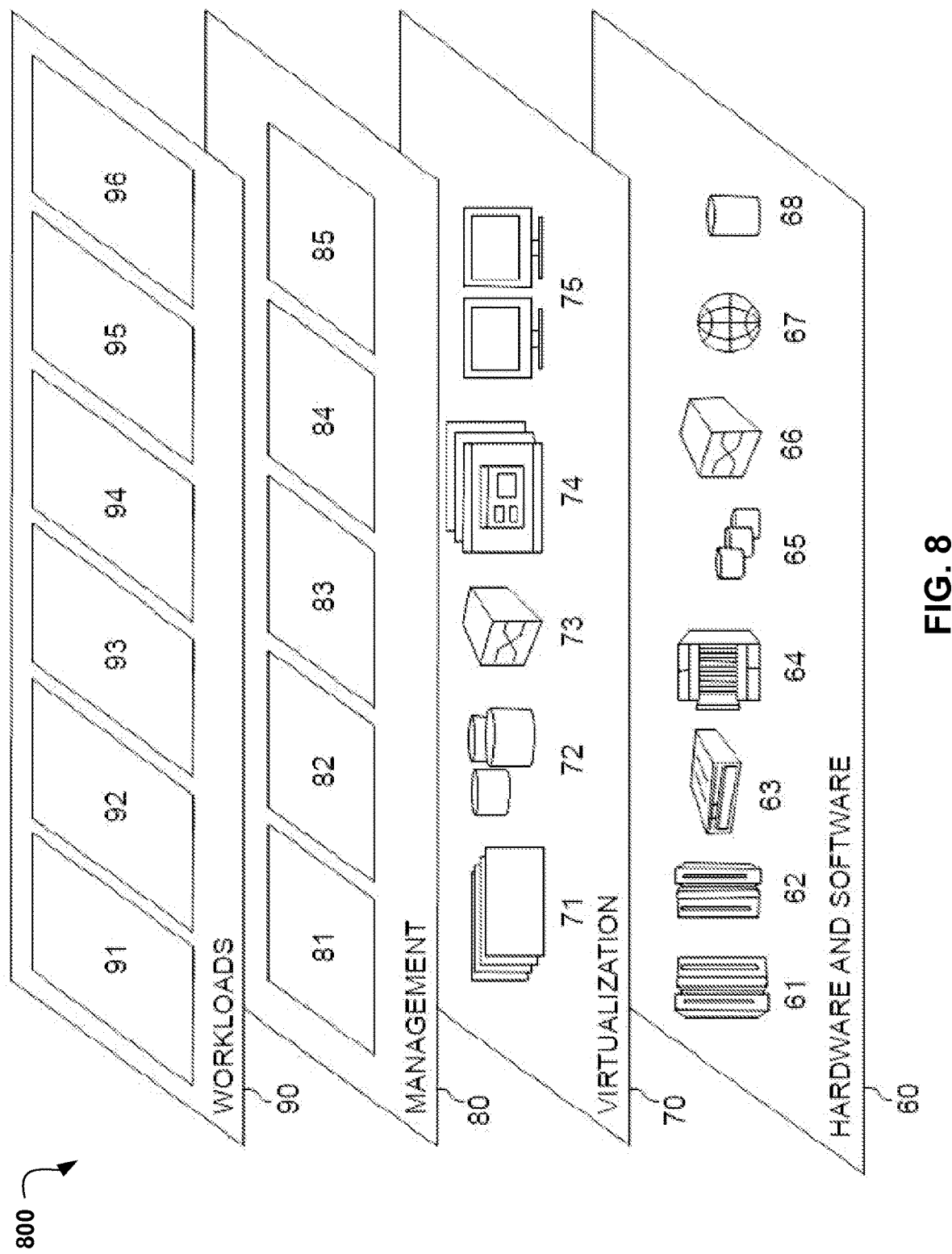
FIG. 8 depicts abstraction model layers according to an embodiment of the present invention.

Referring now to FIG. 8, a set of functional abstraction layers 800 provided by cloud computing environment 700 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and modeling and solving spatiotemporal planning problems 96. Modeling and solving spatiotemporal planning problems may utilize Java-based and REST-based developer-oriented libraries and APIs to enable simplified integration into mobile business solutions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for solving a plurality of spatiotemporal planning problems, the method comprising:
   creating, by a processor, a domain model natively supported in a mobile application;
   performing a partial grounding of the created domain model, wherein each non-spatial entity and each non-temporal entity is grounded and each spatial entity and each temporal entity is ungrounded;
   assigning a solution bound associated with the created domain model to infinity;
   calculating a solution to the created domain model based on the assigned solution bound using a best-first search algorithm, wherein a dead end detection mechanism is utilized to determine whether each entity within the domain model can visit each location within the solution bound;
   updating the assigned solution bound based on the calculated solution; and
   presenting the calculated solution to a user based on the updated solution bound not equaling infinity.

2. The method of claim 1, wherein creating the domain model includes at least one of identifying a plurality of entity types, identifying a plurality of actions, determining one or more domain goals of the domain model, and creating a plurality of entities within the domain model.

3. The method of claim 2, wherein each of the identified plurality of actions is selected from a group consisting of an association with an entity type within the identified plurality of entity types and a plurality of parameters corresponding to the entity type with which each of the identified plurality of actions is associated.

4. The method of claim 2, wherein each of the identified plurality of entity types includes a plurality of properties.

5. The method of claim 4, wherein the plurality of properties comprises an atomic type.

6. The method of claim 2, wherein each of the created plurality of entities is associated with an entity type within the identified plurality of entity types.

7. The method of claim 1, wherein calculating the solution to the domain model further comprises:
   adding an initial state associated with the domain model to an open queue;
   removing a best node from the open queue;
   adding the removed best node to a closed queue;
   determining whether the added best node is a goal node;
   constructing a solution path to the added best node from the added initial state in response to determining the added best node is a goal node;
   generating at least one successor node for the added best node in response to determining the added best node is not a goal node;
   adding the at least one generated successor node to a successor node list;
   determining a cost associated with the at least one generated successor node is not above the set solution bound;
   moving the removed best node from the closed queue to the open queue based on determining the at least one generated successor node has been evaluated; and
   evaluating the at least one generated successor node based on determining the at least one generated successor node has not been evaluated.

8. The method of claim 1, further comprising:
   presenting an error message to a user based on the updated solution bound equaling infinity.

9. A computer system for solving a plurality of spatiotemporal planning problems, the computer system comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

creating a domain model natively supported in a mobile application;

performing a partial grounding of the created domain model, wherein each non-spatial entity and each non-temporal entity is grounded and each spatial entity and each temporal entity is ungrounded;

assigning a solution bound associated with the created domain model to infinity;

calculating a solution to the created domain model based on the assigned solution bound using a best-first search algorithm, wherein a dead end detection mechanism is utilized to determine whether each entity within the domain model can visit each location within the solution bound;

updating the assigned solution bound based on the calculated solution; and presenting the calculated solution to a user based on the updated solution bound not equaling infinity.

10. The computer system of claim 9, wherein creating the domain model includes at least one of identifying a plurality of entity types, identifying a plurality of actions, determining one or more domain goals of the domain model, and creating a plurality of entities within the domain model.

11. The computer system of claim 10, wherein each of the identified plurality of actions is selected from a group consisting of an association with an entity type within the identified plurality of entity types and a plurality of parameters corresponding to the entity type with which each of the identified plurality of actions is associated.

12. The computer system of claim 10, wherein each of the identified plurality of entity types includes a plurality of properties.

13. The computer system of claim 12, wherein the plurality of properties comprises an atomic type.

14. The computer system of claim 10, wherein each of the created plurality of entities is associated with an entity type within the identified plurality of entity types.

15. The computer system of claim 9, wherein calculating the solution to the domain model further comprises:

adding an initial state associated with the domain model to an open queue;

removing a best node from the open queue;

adding the removed best node to a closed queue;

determining whether the added best node is a goal node;

constructing a solution path to the added best node from the added initial state in response to determining the added best node is a goal node;

generating at least one successor node for the added best node in response to determining the added best node is not a goal node;

adding the at least one generated successor node to a successor node list;

determining a cost associated with the at least one generated successor node is not above the set solution bound;

moving the removed best node from the closed queue to the open queue based on determining the at least one generated successor node has been evaluated; and evaluating the at least one generated successor node based on determining the at least one generated successor node has not been evaluated.

16. The computer system of claim 9, further comprising: presenting an error message to a user based on the updated solution bound equaling infinity.

17. A computer program product for solving a plurality of spatiotemporal planning problems, the computer program product comprising:

one or more computer-readable tangible storage medium and program instructions stored on at least one of the one or more tangible storage medium, the program instructions executable by a processor, the program instructions comprising:

program instructions to create a domain model natively supported in a mobile application;

program instructions to perform a partial grounding of the created domain model, wherein each non-spatial entity and each non-temporal entity is grounded and each spatial entity and each temporal entity is ungrounded;

program instructions to assign a solution bound associated with the created domain model to infinity;

program instructions to calculate a solution to the created domain model based on the assigned solution bound using a best-first search algorithm, wherein a dead end detection mechanism is utilized to determine whether each entity within the domain model can visit each location within the solution bound;

program instructions to update the assigned solution bound based on the calculated solution; and program instructions to present the calculated solution to a user based on the updated solution bound not equaling infinity.

18. The computer program product of claim 17, wherein creating the domain model includes at least one of identifying a plurality of entity types, identifying a plurality of actions, determining one or more domain goals of the domain model, and creating a plurality of entities within the domain model.

19. The computer program product of claim 18, wherein each of the identified plurality of actions is selected from a group consisting of an association with an entity type within the identified plurality of entity types and a plurality of parameters corresponding to the entity type with which each of the identified plurality of actions is associated.

20. The computer program product of claim 17, wherein calculating the solution to the domain model further comprises:

program instructions to adding an initial state associated with the domain model to an open queue;

program instructions to remove a best node from the open queue;

program instructions to add the removed best node to a closed queue;

program instructions to determine whether the added best node is a goal node;

program instructions to construct a solution path to the added best node from the added initial state in response to determine the added best node is a goal node;

program instructions to generate at least one successor node for the added best node in response to determining the added best node is not a goal node;

program instructions to add the at least one generated successor node to a successor node list;

program instructions to determine a cost associated with the at least one generated successor node is not above the set solution bound;

program instructions to move the removed best node from the closed queue to the open queue based on determining the at least one generated successor node has been evaluated; and program instructions to evaluate the at least one generated successor node based on determining the at least one generated successor node has not been evaluated.

\* \* \* \* \*